United States Patent [19]

McClaflin

[11] Patent Number: 4,724,907

[45] Date of Patent: * Feb. 16, 1988

[54] METHOD AND DEVICE FOR BLENDING SURFACTANT MIXTURES FOR TREATMENT OF OIL WELLS

[75] Inventor: Gifford G. McClaflin, Ponca City, Okla.

[73] Assignee: Conoco Inc., Ponca City, Okla.

[*] Notice: The portion of the term of this patent subsequent to Aug. 12, 2003 has been disclaimed.

[21] Appl. No.: 873,034

[22] Filed: Jun. 11, 1986

Related U.S. Application Data

[63] Continuation-in-part of Ser. No. 740,611, Jun. 3, 1985, abandoned.

[51] Int. Cl.$^4$ .................. E21B 43/00; E21B 43/40
[52] U.S. Cl. .................. 166/310; 166/75.1; 166/91; 166/267; 166/371
[58] Field of Search ............ 166/75.1, 91, 279, 304, 166/305.1, 310, 312, 371, 266, 267; 252/8.55 B, 327

[56] References Cited

U.S. PATENT DOCUMENTS

| | | | |
|---|---|---|---|
| 1,879,849 | 9/1932 | Hunter | 252/327 |
| 1,923,098 | 8/1933 | Knight et al. | 166/75.1 |
| 2,089,035 | 8/1937 | Oberlin | 166/310 |
| 2,446,040 | 7/1948 | Blair, Jr. | 252/327 |
| 3,103,972 | 9/1963 | Parker | 166/266 |
| 3,223,167 | 12/1965 | Hampton | 166/902 X |
| 3,228,472 | 1/1966 | Rhoads, Jr. | 166/75.1 X |
| 3,241,614 | 3/1966 | Bertness | 166/304 |
| 3,380,531 | 4/1968 | McAuliffe et al. | 166/371 |
| 3,463,231 | 8/1969 | Hutchison et al. | 166/371 X |
| 3,870,063 | 3/1975 | Hayward | 166/267 X |
| 4,354,553 | 10/1982 | Hensley | 166/902 X |
| 4,436,148 | 3/1984 | Maxwell | 166/91 X |
| 4,605,069 | 8/1986 | McClaflin et al. | 166/310 |

OTHER PUBLICATIONS

Berkman et al, *Emulsions and Foams*, Reinhold Publishing Corporation, 1941, pp. 285, 286.

Simon et al, "Down-Hole Emulsification for Improving Viscous Crude Protection", *Journal of Petroleum Technology*, vol. XX, No. 12, Dec. 1968, pp. 1349–1353.

*Primary Examiner*—George A. Suchfield
*Attorney, Agent, or Firm*—C. R. Schupbach

[57] ABSTRACT

A method of improving production of heavy crude oil from a well by mixing a first solution of water soluble surfactant and water, and preferably forming a mixture of the first solution and an oil solvent, and pumping the mixture into the well to mix with the heavy crude oil to be produced. A desirable surfactant is a water soluble ethoxylated nonylphenol and a desirable oil solvent is kerosene distillate.

6 Claims, 1 Drawing Figure

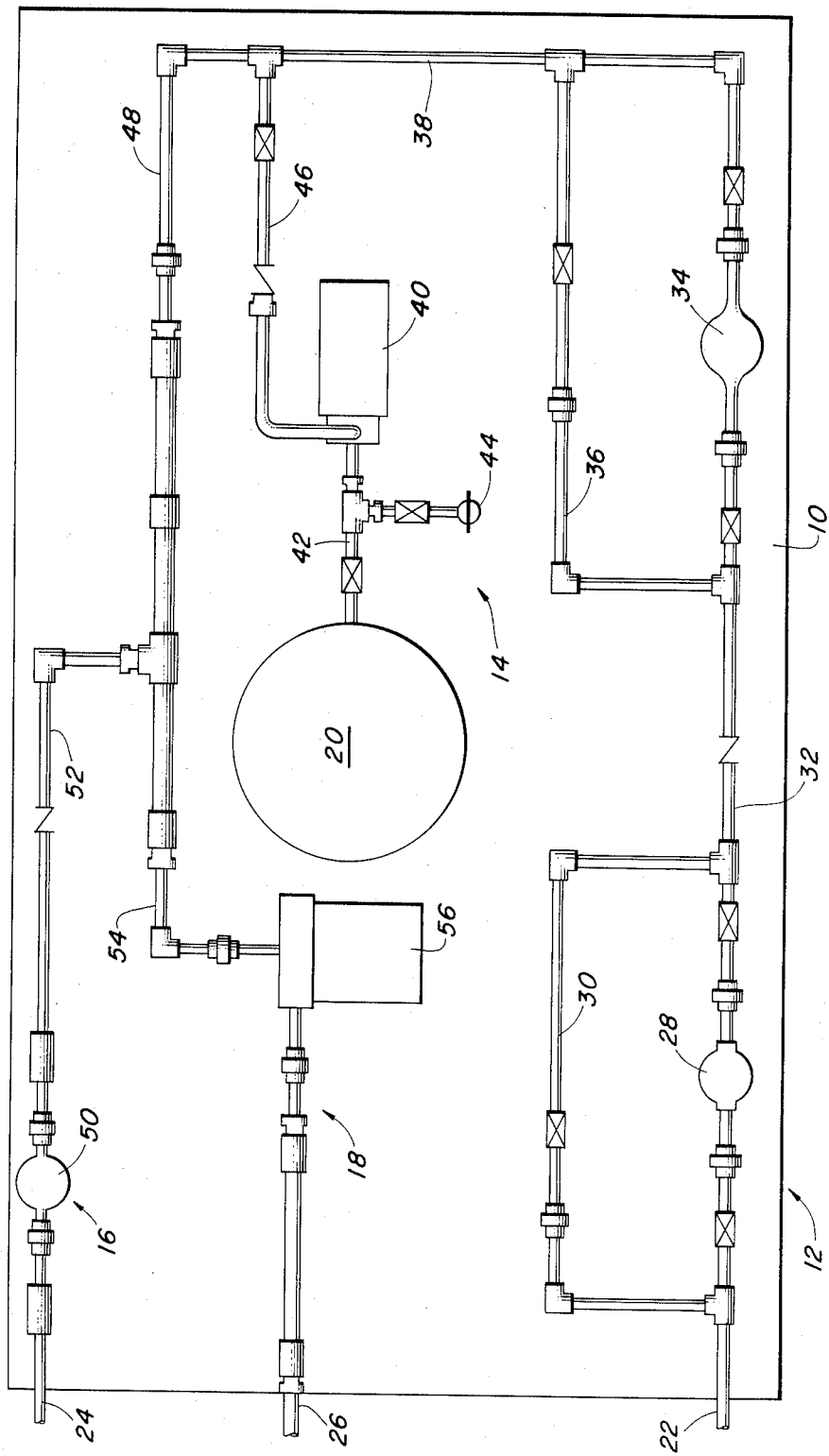

METHOD AND DEVICE FOR BLENDING SURFACTANT MIXTURES FOR TREATMENT OF OIL WELLS

This application is a continuation-in-part of application U.S. Ser. No. 740,611 filed June 3, 1985, now abandoned.

BACKGROUND OF THE INVENTION

1. Field of the Invention

This invention relates in general to methods and devices for blending surfactant mixtures and utilizing these surfactant mixtures for treating wells producing heavy hydrocarbons.

2. Brief Description of the Prior Art

Production and pumping of heavy crude oil has long been a problem because of the high viscosity of the crude oil and because of the accumulation of paraffins, tars and other heavy hydrocarbons in the wellbore and tubing. It has long been known that this problem can be somewhat alleviated by introducing a solvent into the crude oil to reduce its viscosity. For example, a kerosene distillate can be pumped through the annulus of the well to the production zone where it mixes with the crude oil from th producing formation. The kerosene distillate reduces the viscosity of the heavy crude oil to make it more easily pumped and it also helps to remove accumulations in the tubing.

A significant disadvantage of using solvents such as kerosene distillate is that such use is often expensive. For example, it may require as much as one-quarter to one-half barrel of kerosene distillate or more to produce one barrel of heavy crude oil.

U.S. Pat. No. 3,241,614 to Burtness, discloses a method of utilizing a surfactant with the solvent for cleaning wellbores. More particularly, a surfactant is mixed with a solvent and injected into the wellbore, followed with an injection of water. The surfactant has both an oil soluble and a water soluble characteristic allowing the water to assist removal of the accumulations in the wellbore. It is also stated that a mixture of solvent, surfactant and water can be injected into the well to prevent further accumulation of the heavy hydrocarbons. In these mixtures, the surfactant may be as high as sixty-five percent by weight of the solvent and the water may be in an amount as high as seventy-five percent by volume of the solvent and water.

The above-described methods are not as satisfactory for improving the production of heavy crude oil from a well as the present invention.

SUMMARY OF THE INVENTION

It is accordingly, an object of the present invention to provide a method of improving production of heavy crude oil from a well. More particularly, it is an object of the present invention to provide such a method which utilizes less expensive materials and is less expensive to separate from the produced oil.

In accordance with these objects, a method of improving production of heavy crude oil from a well by blending a water-surfactant solution with the oil to be produced is provided. This method comprises preparing a solution by mixing a water soluble surfactant with water. This first solution is then preferably, but not critically, mixed with an oil solvent to produce a mixture and the mixture is injected into the well and mixed with the crude oil to be produced. Preferably, the water soluble surfactant comprises an ethoxylated alkyl phenol. Also preferably, the solvent comprises a kerosene distillate. Most preferably, but not critically, the ethoxylated alkyl phenol comprises nonylphenol ethoxylated with an average number of ethylene oxide units per molecule of from 20 to approximately 50. The solvent such as kerosene distillate, can be added at any point in the oil production as desired, or can be omitted altogether.

Preferably the mixing step which forms the solution and the subsequent injection of the solution into the well are performed continuously by forming a first stream of water into which said surfactant is pumped to form a stream of said solution. The first solution stream is then preferably mixed with a second stream of said kerosene distillate which stream is injected into the well.

For further understanding of the invention and further objects, features and advantages thereof, reference may now be had to the following description of the preferred embodiment taken in conjunction with the accompanying drawings.

BRIEF DESCRIPTION OF THE DRAWING

The FIGURE is a schematic view of the blending method of preferred embodiment of the present invention and the equipment for such blending.

DESCRIPTION OF PREFERRED EMBODIMENTS

Referring now to the FIGURE the blender equipment for blending the first solution and second mixture of the method of the present invention is shown mounted on a skid 10. The skid allows the blending equipment to be easily transported from well to well. Mounted on the skid are water conducting and metering parts 12, surfactant storage and metered pumping 14, solvent conducting and metering parts 16 and injection pump arts 18. A barrel of surfactant 20 is mounted on the skid 10 and forms part of the surfactant storage and metered pumping parts 14. Water enters the blending unit under pressure through a water supply pipe 22. In the preferred embodiment, solvent enters the blender through a solvent pipe 24. The blended water-surfactant-solvent mixture exits the blender via ejection pipe 26.

Water entering the blender through water supply pipe 22 first passes through a pressure reducing regulator 28. A by-pass loop 30 is provided around the pressure reducing regulator 28. The pressure reducing regulator 28 typically reduces water pressure from three hundred pounds at its inlet to between seventeen to thirty pounds at its outlet. Water from the outlet of the pressure reducing regulator 28 is conveyed by a pipe 32 to a water meter 34. The meter 34 produces a signal proportional to the volume of water passing therethrough. The signal is preferably a pulse-type signal. Such water meters are well-known in the metering art. Water meters with a one to fifteen gallon per minute range and four pulse per gallon signal output are suitable.

A by-pass loop 36 is provided around the water meter 34 to prevent damage to the water meter 34. The outlet of water meter 34 is a pipe 38. The water passing through pipe 38 has its pressure regulated as a result of the pressure reducing regulator 28 and the flow therethrough is measured by the water meter 34. Water does not pass through the bypass loops 30 and 36 during normal blending and these loops are provided only for the protection of the pressure reducing regulator 28 and the water meter 34.

Surfactant from drum 20 is conveyed to the inlet of a chemical pump 40 by means of a pipe 42. The volume of flow through pipe 42 is metered by a drum gauge 44. The outlet of chemical pump 40 is a pipe 46 which is connected to pipe 38 which carries the metered and pressure regulated water. Pipe 48 conveys the solution resulting from the combined water and surfactant from pipes 38 and 46.

The chemical pump 40 is preferably a diaphragm-type chemical pump with a variable stroke length and speed. It is connected to and receives the pulsed signals from the water meter 34 and is responsive to the signals to produce a surfactant flow proportional to the water flow in pipe 38. Such chemical pumps are well-known in the art of pumping liquids. The pump must be sized to provide adequate material to the well for desired recovery rates. The amount of surfactant flow in pipe 46 produced by the chemical pump 40 can be adjusted to produce the desired proportion of surfactant to water.

In the preferred embodiment, solvent entering the blender through the solvent supply pipe 24 is regulated by a solvent meter and valve 50. The solvent meter and valve 50 regulates and measures the flow of solvent. The outlet of the meter and valve 50 is connected to a pipe 52 which joins pipe 48. Thus, the flow of solvent in pipe 52 mixes with the solution of surfactant and water flowing in pipe 48. The resulting mixture is conveyed through a pipe 54 to an injection pump 56. The outlet of the injection pump 56 is injection pipe 26. Typically, the injection pump 56 is centrifugal discharge pump.

Injection pipe 26 is connected to the wellbore of a well into which the solution is to be pumped. This allows the water-surfactant or water-surfactant-solvent to be conveyed through the wellbore to the producing zone and into the crude oil being produced into the well.

In use, the blender equipment described above mixes a pressure regulated and metered stream of water with a proportional quantity of surfactant to produce a first solution stream in pipe 48. In the preferred embodiment, a measured and regulated stream of the viscous crude. Many wells producing viscous crude oils are located where legislation prohibits placing hydrocarbons into oil bearing formations. In producing such wells, the optional solutions such as kerosene distillate can be added to the surfactant/water solution once the emulsion of crude oil/water surfactant is recovered from the well. Often such solvents are added to raise the API gravity of the crude oil contained in the recovered emulsion to enhance separation of such crudes from emulsion with the surfactant/water. Such solvents would normally be added in an amount sufficient to raise the API gravity of the recovered crude to at least 12 degrees.

The surfactants which are suitable for use in the blending method of the present invention must be water soluble. For example, a water soluble ethoxylated alkyl nonylphenol is a suitable water soluble surfactant, and when ethoxylated with an average number of ethylene oxide units per molecule of from 20 to approximately fifty, it is an especially desirable surfactant. Such an ethoxylated nonylphenol is sold by the Thompson-Hayward Company under the tradename T-DET N-507 (where 50 indicates an average of 50 units of ethylene oxide per molecule and 7 indicates about 70% active material). Another suitable surfactant is an ethoxylated alcohol surfactant formed by ethoxylating alcohols or mixtures of alcohols containing from 6 to 18 carbon atoms, and preferably 10 to 16 carbon atoms, and most preferably 12 to 14 carbon atoms, wherein the ethylene oxide comprises from 30% to 90% of the surfactant on a weight basis and preferably from 40% to 70% by weight of the surfactant. Mixtures of these surfactants can be used. While several solvents for hydrocarbons are capable of being used with the present invention, one of the most desired solvents is kerosene distillate. It is important that the surfactant have a surface active property with respect to the solvent. It is preferred that the solvent be added to the solution of water and surfactant in order to properly form the mixture which is then injected into the well. It is emphasized that the solvent is optional at any point, but is preferred to more easily entrain viscous crudes in the surfactant-water solution and to raise the API gravity of the crude to enhance separation from the lifting emulsion.

The solution resulting from the mixture of surfactant and water preferably contains an effective amount of surfactant. Normally concentrations of surfactant will be in the range of 1000 ppm to twenty percent by weight of the combined solution. Similarly, the mixture of water-surfactant-solvent normally contains a proportion of solvent in the range of 1 to 50 percent by weight, preferably 5 to 20 percent by weight of the combined solution when practicing the preferred embodiment.

It has been found that the preferred method of mixing the water-surfactant-solvent solution and injecting the solution into a well allows production of heavy crude oil from the well in a manner similar to that provided by solvent injection alone but with much less expense for materials. The amount of the second solution stream which must be injected into the well varies according to the viscosity of the crude oil and its composition. Typically, approximately one barrel of the water-surfactant is injected per barrel of the produced crude. The solvent is added in varying amounts to adjust the specific gravity of the solution as recovered for most efficient recovery.

The water soluble surfactant is much easier to separate from the produced crude than other surfactants and less surfactant is necessary compared to oil soluble surfactants.

Thus, the method of the present invention is well adapted to attain the objects and advantages mentioned as well as those inherent therein. While presently preferred embodiments of the invention have been described for the purpose of this disclosure, numerous changes in the equipment utilized and the method steps can be made by those skilled in the art which changes are encompassed within the spirit of this invention as defined by the appended claims.

The foregoing disclosure and the showings made in the drawings are merely illustrative of the principles of this invention and are not to be interpreted in a limiting sense.

I claim:

1. A method of improving production of heavy crude oil from a well by blending a water surfactant solvent solution with the oil to be produced comprising the continuous sequential steps of mixing a water soluble surfactant with water to produce a first solution by introducing a proportional stream of surfactant into a metered stream of water, mixing said first solution with an oil solvent to produce a second solution by introducing a metered stream of solvent into said first solution, and pumping the second solution into the well, and mixing the crude oil to be produced with the second solution to form an emulsion, and continuously producing the formed emulsion.

2. The method of claim 1 wherein said surfactant is at least one surfactant selected from the group consisting of a water soluble ethoxylated alkyl phenol and a water soluble ethoxylated alcohol wherein the alcohol contains from 6 to 18 carbon atoms.

3. The method of claim 2 wherein said water soluble ethoxylated alkyl phenol comprises ethoxylated nonylphenol having an average number of ethylene oxide units per molecule of from 20 to approximately 50 and the ethylene oxide units of the ethoxylated alcohol comprises from 30% to 90% by weight of the ethoxylated alcohol surfactant.

4. The method of claim 3 wherein said first solution is formed having a surfactant concentration of from one to ten percent by weight.

5. The method of claim 4 wherein the mixture contains solvent at a concentration of from 1000 ppm to twenty percent by weight of said mixture.

6. The method of claim 3 wherein sufficient solvent is added to the recovered crude after removal from the wellbore to raise the API gravity of the crude oil in the recovered emulsion to at least 12 degrees.

* * * * *